United States Patent [19]

Molnar

[11] 4,205,566
[45] Jun. 3, 1980

[54] MACHINE FOR MASS PRODUCTION CUTTING OF TUBES

[76] Inventor: Michael Molnar, 4381 Valley Forge Dr., Fairview Park, Ohio 44126

[21] Appl. No.: 895,088

[22] Filed: Apr. 10, 1978

[51] Int. Cl.$^2$ ............................................. B23B 5/14
[52] U.S. Cl. ........................................ 82/101; 82/83; 82/102; 198/480; 198/648; 414/757
[58] Field of Search ....................... 82/46, 47, 85, 101, 82/102, 83; 113/28; 198/480, 648; 214/1 BD, 1 P

[56] References Cited

U.S. PATENT DOCUMENTS

| | | | |
|---|---|---|---|
| 932,552 | 6/1909 | Mill | 82/85 |
| 3,238,908 | 3/1966 | Gilbert | 113/28 |
| 3,302,500 | 2/1967 | Hackenberger et al. | 82/97 |
| 3,797,338 | 3/1974 | Molnar | 82/102 |
| 4,023,513 | 5/1977 | Dean | 82/101 |

*Primary Examiner*—Leonidas Vlachos
*Attorney, Agent, or Firm*—Pearne, Gordon, Sessions, McCoy & Granger

[57] ABSTRACT

A simple, economical, drum-type tube cutting machine is disclosed which employs a conventional drum for high-speed automatic cutting of ordinary tubes and a special drum for high speed cutting of tubing which could not otherwise be cut satisfactorily because of special problems due for example to flimsy walls, excessive diameter or excessive wall thickness. The special drum employs a series of replaceable generally semi-cylindrical vanes which fit the tubes to prevent them from collapsing or moving out of position during the cutting operation and to hold them in position after they are cut so that internal supporting mandrels are not needed. The internal radius of the vanes is selected to match the external radius of the tubes being cut and is changed when the tube radius is changed. The machine is constructed to deliver the tubes one at a time from a feed ramp without an auxiliary escapement mechanism and to effect high-speed gang cutting using a conventional endless-band arrangement to rotate the tubes during cutting. The invention makes it possible to use existing machines which are modified to receive the special drum and to mass produce tubular pieces of many different diameters in a safe, reliable continuous manner at rates of production much higher than can be achieved when using mandrels. High rates of production can also be obtained even when the tubes to be cut are dented or deformed.

5 Claims, 5 Drawing Figures

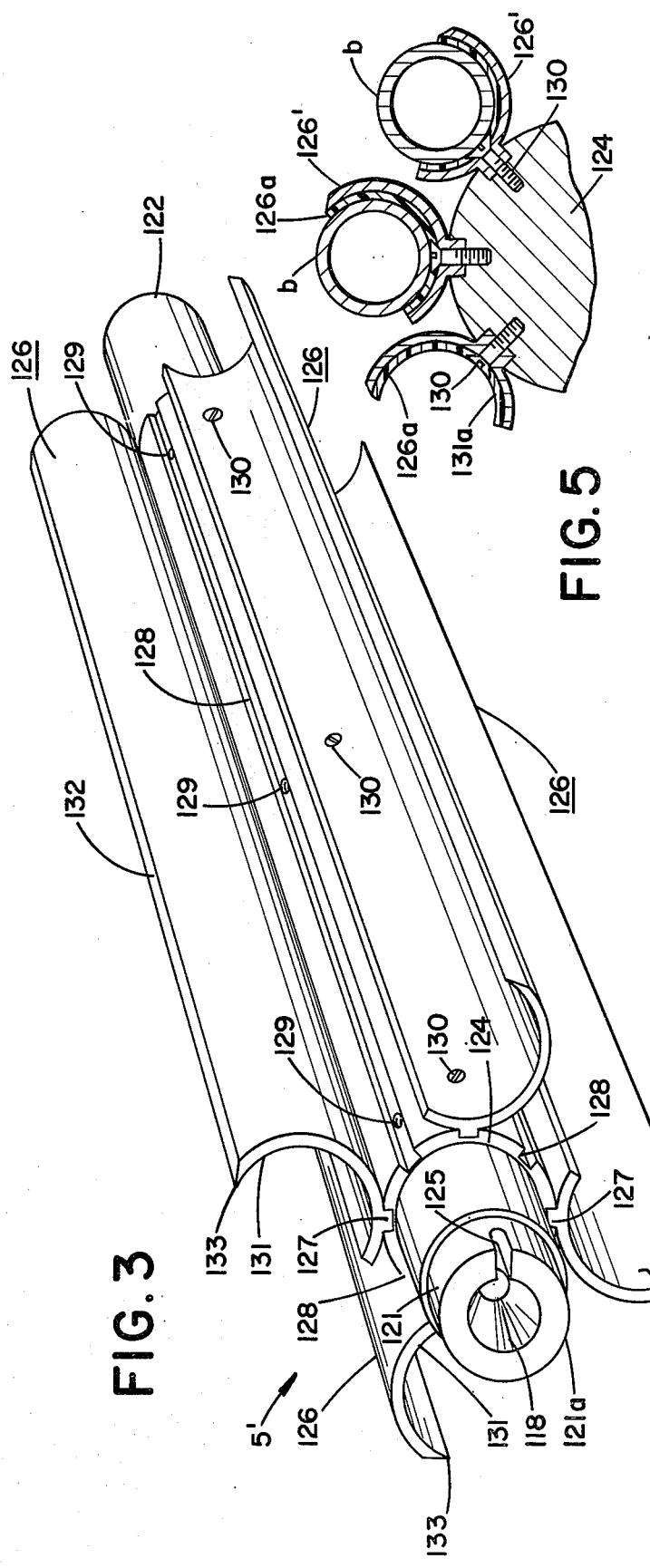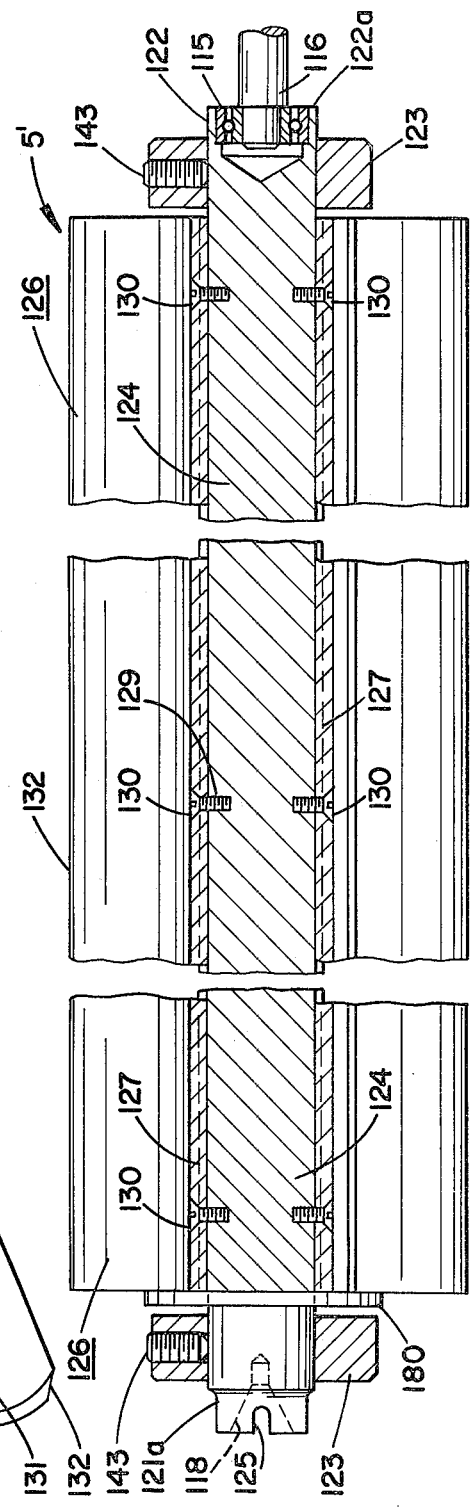

MACHINE FOR MASS PRODUCTION CUTTING OF TUBES

BACKGROUND OF THE INVENTION

The present invention relates to an improved tube cutting apparatus and more particularly to a high-speed drum-type tube cutting machine designed for mass production cutting of tubes which could not be cut satisfactorily on conventional machines.

For many years mass production cutting of thin-walled tubes has been effected using semi-automatic drum-type cutting machines having rotating endless belts at the side of the drum adjacent the rotary cutters for engaging the tubes to hold them in parallel positions on the drum while rotating them at an angular velocity at least several times that of the drum and having a series of axially spaced rotary knives or cutters with cutting teeth located to project slightly beyond the internal surface of each tube. The endless belts cause each tube to rotate at least one revolution while in contact with the rotary cutters so that cutting is effected throughout the circumference of the tube.

These machines have performed extremely well and have been used extensively for almost two decades for gang cutting of tubes of small and medium diameter. However, prior to the present invention, certain gang cutting operations could not be performed satisfactorily on such machines. For example, gang cutting operations could not be performed satisfactorily when the tubes being cut had walls with insufficient thickness or insufficient strength or rigidly to maintain the circular cross section during cutting. If an attempt were made to cut large diameter tubes having readily deformable walls, these machines would not function satisfactorily because the cut pieces tend to collapse and be forced between the rotating cutters and the drum.

Gang cutting also presented serious problems if the tubes being cut had a very short axial length relative to the diameter because of the tendency of cut pieces to tilt and be chewed up by the rotary cutters. Gang cutting also was a problem when cutting tubes with walls of substantial thickness or substantial resistance to cutting by conventional rotary knives because the knives tended to bind and pull or force the tubes out of position during cutting. These various problems resulted in frequent malfunctions so that the automatic machines could not operate continuously in a reliable manner and were not considered satisfactory for commercial use.

Because of these problems, it was the practice prior to this invention to employ supporting mandrels when cutting thick tubes, large diameter tubes or tubes with flimsy or readily collapsible walls or when cutting washers or other pieces of very small axial dimension. This resulted in a great increase in the cost of the cutting operation and a reduction in the rate of production, particularly when the mandrels were loaded and unloaded manually.

Expensive automatic mandrel-type machines are available commercially which employ complicated reciprocating mechanisms to slide the tubes onto the mandrel and to remove the cut pieces, but the rate of production when using these machines is only a fraction of that which can be achieved on drum-type machines. Furthermore these mandrel-type machines require tubes with internal surfaces relatively free of dents, deformations or other internal defects which interfere with axial sliding of the tube over the mandrel. Malfunctions in these machines resulting from said internal defects or other problems can cause serious damage to the complicated mechanisms and present a serious safety hazard.

Another disadvantage of mandrels is that the rotating knives or cutters must be carefully positioned so that they do not cut the mandrel. Cleaner cuts are obtained when the knife or cutter projects beyond the internal surface of the tube being cut, less problems are encountered with the rotating cutter when cutting can be effected without mandrels.

SUMMARY OF THE INVENTION

The present invention provides a simple solution to the above mentioned problems and makes it possible to effect mass production cutting of many different types of tubes which heretofore could not be cut satisfactorily on automatic gang cutting machines. The invention is particularly advantageous because it does not involve a substantial investment in new equipment but merely involves a simple modification of an existing machine. The invention makes it possible for small manufacturing plants to modify the existing tube cutting machines in an economical manner and makes it possible to use the same machines for cutting ordinary tubes using the conventional drum and for cutting special tubes which could not otherwise be cut using the special drum of the present invention. The special drum can be used for example in cutting washers or short lengths of tubing or in cutting tubes with flimsy walls, tubes with relatively large diameters, such as 3 to 4 inches or more, or tubes of moderate or small diameter having walls of substantial thickness, such as 0.2 inch or more, which are not easily cut by the rotary knives.

The problem of cutting special tubing such as that having a large diameter, unusually thick walls of flimsy collapsible walls is solved, in accordance with the present invention, by replacing the conventional drum assembly, such as the drum assembly of U.S. Pat. No. 3,797,338, with a special drum assembly provided with a series of removable vanes of arcuate cross section of a size to fit and support the tube to be cut around half of its circumference. Each arcuate vane supports a tube at closely spaced points extending about half way around the tube to control the position of the tube wall during cutting and/or to prevent collapse thereof. This peripheral support can be provided either at axially spaced locations or throughout the length of the tube and is preferably provided by a generally semi-cylindrical vane. Each curved vane may have a polished internal semi-cylindrical surface to minimize friction during rotation of the tube and to facilitate movement of the tubes into the vane.

The drum is preferably constructed to receive different numbers of vanes which can be rigidly and detachably connected to the drum. This permits adjustment of the number and size of the vanes in accordance with the diameter of the tubes to be cut. For example, the drum can be provided with circumferentially spaced mounting holes, key slots or other circumferentially spaced means for mounting 3 to 12 or more removable semi-cylindrical vanes of different internal radii. A single automatic machine of the type shown in said patent can be provided with several drums of different sizes, each adapted to receive up to 8 to 12 vanes of different radii, whereby the same machine can handle large tubes of many different diameters. By adjusting the position of the feed ramp and the size of the vanes, reliable high-speed operation can be achieved with tubes of small or large diameter.

The semi-cylindrical vanes, when used, for example, in conjunction with suitable stop means, provide a simple, reliable escapement mechanism to facilitate feeding of tubes one at a time from the loading ramp to the drum. The machine can be indexed rapidly to permit feeding of large tubes to the drum at a rate of 30 or more per minute. When the invention is practiced using 10 to 20 rotary cutters on the spindle, the rate of production can be 300 to 600 per minute even when the tube diameter is 3 to 4 inches or more.

The use of semi-cylindrical vanes in accordance with this invention is especially important because of the admirable control over the position of the tubes during cutting which permits the use of the standard rotating knives for tubes which have relatively thick walls or short axial lengths. This improved control avoids malfunctions which might otherwise occur frequently due to the tendency of the rotating knives to bind in the work and pull or force the tubes out of position.

The invention represents a giant step forward in the art of cutting tubing because of improved reliability and vastly improved rates of production as compared to mandrel-type machines and also because the machines are safer to operate and require less supervision. Because of the simple mode of feeding, an occasional malfunction in the machine of this invention is of no particular danger to the operator and is not likely to damage the machine even if the rotating knives ruin a substantial number of tubes before the malfunction is corrected.

An object of the present invention is to provide simple, efficient equipment for reliable mass production cutting of flimsy or large diameter tubing whose walls have low resistance to deformation, thick-wall tubing and other tubing which heretofore could not be cut satisfactorily on conventional drum-type tube cutting machines.

Further objects of the invention are to eliminate the need for supporting mandrels when cutting flimsy or large diameter tubing or thick-wall tubing, to minimize the cost of cutting large numbers of pieces from such tubing, and to eliminate maintenance problems and safety hazards due to complicated reciprocating feed mechanisms.

Another object of the invention is to provide an inexpensive auxiliary drum for existing tube cutting machines so that such machines can cut both large and small tubing of widely varying wall thickness. Another object of the invention is to provide a simple auxiliary drum for an automatic tube cutting machine which provides optimum control over the position of the tubes during cutting and which permits gang cutting of tubular pieces having very short lengths and/or relatively thick walls using conventional rotary knives.

These and other objects, uses and advantages of the invention will become apparent to those skilled in the art from the following drawings, description and claims.

BRIEF DESCRIPTION OF THE DRAWINGS

In the drawings:

FIG. 3 is a perspective view on a reduced scale showing a drum assembly which can be used in the machine;

FIG. 4 is a foreshortened vertical sectional view taken through the axis of the drum of FIG. 3; and FIG. 5 is a fragmentary vertical sectional view showing a portion of a drum having eight semi-cylindrical vanes mounted thereon in accordance with the invention.

DESCRIPTION OF THE PREFERRED EMBODIMENTS

Figure 1:
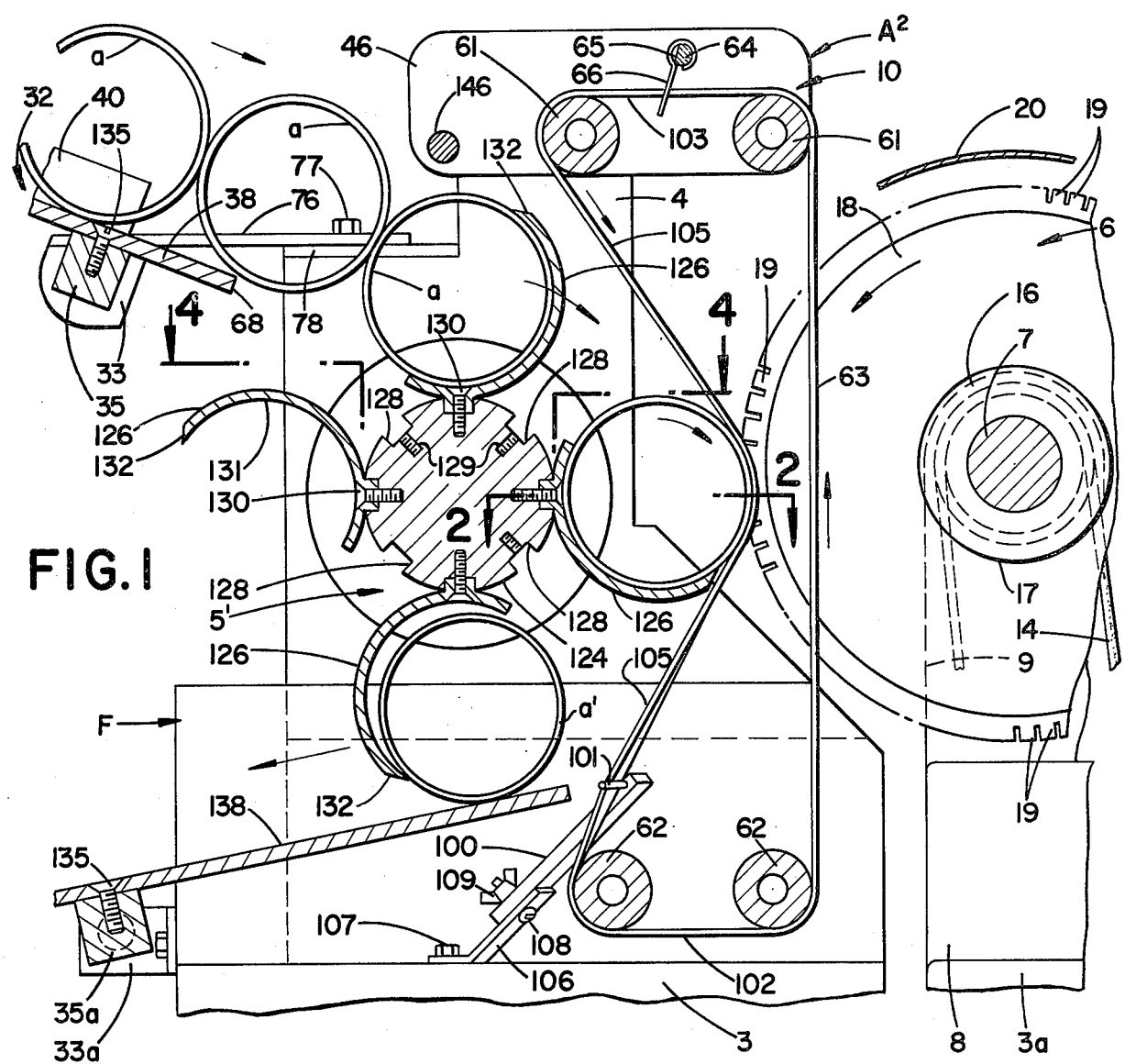
FIG. 1 is a fragmentary vertical sectional view of an improved tube cutting machine constructed according to this invention on a reduced scale.
Figure 2:
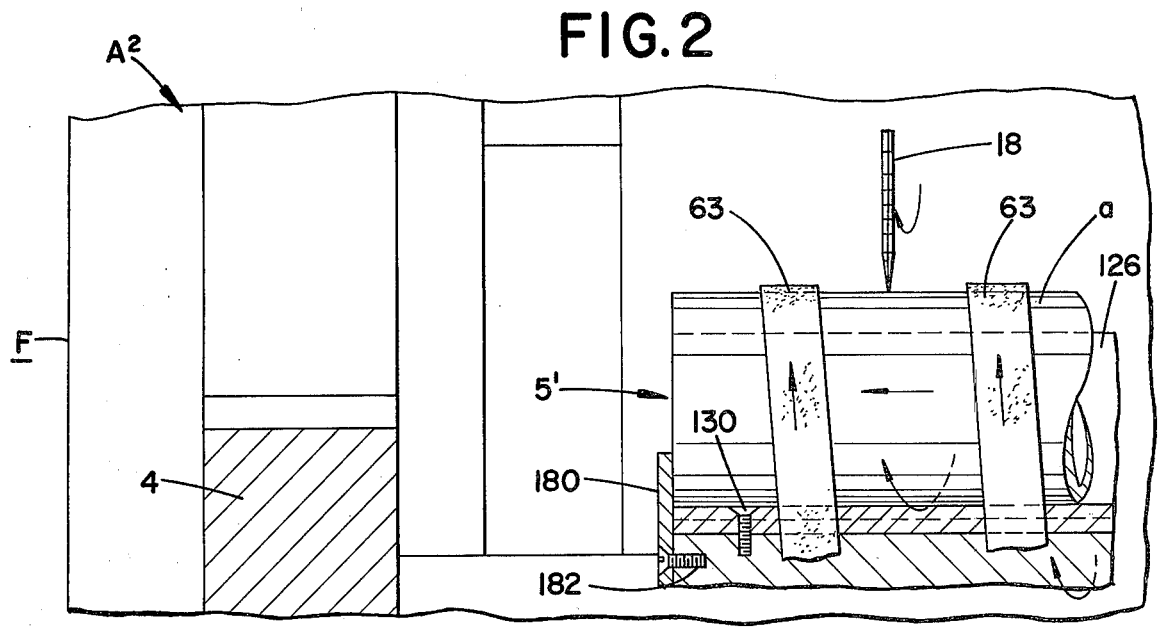
FIG. 2 is a fragmentary horizontal sectional view of the machine looking in the direction of the arrows 2—2 of FIG. 1 and on a larger scale.

Referring more particularly to the drawings, FIGS. 1 to 4 show a tube cutting machine $A^2$ which, except for the unique drum assembly and associated elements, is basically the same as conventional tube cutting machines of the general type illustrated in my U.S. Pat. No. 3,797,338, the entire disclosure of which is hereby incorporated by reference. The basic elements of the machine A shown herein which are already known are the same as or comparable to those shown in said patent, and such elements are identified by the same numerals as used in the patent to facilitate comparison.

Said patent relates to a specific improvement in a standard type of automatic tube cutting machine, which has been widely used in the industry for many years. This improvement made it possible to modify the standard machines so that they could cut very short lengths of tubing one at a time from longer lengths. The present invention relates to a much more important improvement in the standard machines which makes possible high-speed cutting of thick-walled tubes and flimsy thin-walled tubes of small, medium or large diameter, which heretofore could not be cut on such machines. This provides a simple solution to a very serious problem which has existed for more than a decade.

Because most of the elements of the machine $A^2$ are well known, reference is made to said U.S. Pat. No. 3,797,338 to explain how the unique drum assembly of this invention can be used in a conventional tube cutting machine.

The tube cutting machine $A^2$ has a rigid frame F as described in said patent including horizontal portions 3 and 3a (FIG. 1), a pair of upright end portions 4 for supporting a drum assembly 5' or the assembly 5 of said patent, and a rotary cutter assembly 6 mounted on the frame F at one side of the drum assembly.

The cutter assembly 6 is the same as that disclosed in the patent and includes a main cylindrical spindle 7 rotatably mounted in a horizontal position parallel to the drum shaft. The spindle 7 is supported above a horizontal slide 8 between a pair of upright end portions 9 carried by the slide. The slide is mounted in a horizontal position on the horizontal portion 3a of the frame F and is guided for sliding movement toward and away from the drum assembly. The slide may be adjusted to any desired position.

The spindle 7 is driven by means of a drive assembly as described in more detail in said patent, which drive includes a pulley-driven belt 14 and a pulley wheel 16 arranged to drive the spindle.

A series of spacer collars 17 are slidably mounted on the spindle to provide means for holding one or more rotary knives 18. Each spacer collar is a metal cylinder of predetermined length, and the collars may be arranged end-to-end so as to extend substantially the full length of the spindle.

Each knife 18 is a flat circular disc which is preferably slotted to provide a multiplicity of regularly spaced teeth 19 and which may have a cross section as shown in FIG. 11 of said patent. Each knife is adapted to fit the spindle and be clamped tightly in place between a pair of collars 17. A curved protective shield 20 is rigidly mounted on the slide concentric to the rotary knives.

The tube cutting machine A² can employ a conventional drum assembly 5 as illustrated in said U.S. Pat. No. 3,797,338 or an improved drum assembly 5' as illustrated herein. The drum is mounted for rotation about a horizontal axis parallel to the axis of the spindle 7 and has a shaft means journaled in the frame at its opposite ends. The drum assembly has a conventional drive means (not shown) for rotating the drum shaft, which may be as shown in said patent.

Conventional means may be provided for feeding a series of tubes a to the drum assembly and may include conventional escapement mechanisms to feed the tubes one at a time while preventing cascading. However, the unique drum assembly 5' is constructed so that such auxiliary equipment is not needed.

As in said patent, the feed means for the drum assembly includes an inclined feed table 32 mounted on a pair of mounting brackets 33 carried by the upright frame portions 4. A horizontal bar 35 of square cross section is rigidly connected to the flat board 38 of the table by screws 135 and extends between the brackets 33 parallel to the drum axis and to the straight edge 68 of the board. Means may be provided for adjusting the bar 35 horizontally or vertically in accordance with the diameter of the tubes being cut. For example, the position of the support 76 can be adjusted by loosening and tightening the cap screw 77, and the height of support 76 can be adjusted by replacing the spacer plate 78 with a similar plate of different thickness.

Adjustable guide means may be provided on the table 32 to engage the ends of tubes a and to guide them as they roll toward the drum. The guide means may be a straight metal angle 40 as shown in said patent and may include auxiliary guide means, such as the optional guide means 45 of the patent. The latter is not needed when feeding large diameter tubes in accordance with this invention.

The tube cutting machine A² is provided with an endless belt assembly 10 as disclosed in said patent to effect rotation of the tubes a during the cutting operation. The assembly 10 includes a pair of upper cylindrical rolls 61 mounted on the members 46 for rotation about horizontal axes parallel to the shafts 7 and 125, a pair of similar rolls 62 mounted on the frame for rotation about parallel axes, and a series of endless rubber bands 63 mounted on the rollers 61 and 62.

A horizontal rod 64 of generally semi-circular cross section extends between the rigid supporting members 46 and has a flat surface 65 on one side. The rod has a cross section such as to receive a series of P-shaped wire band guides 66 which may be moved axially to any desired position. Each band guide 66 grips the rod 64 to resist axial movement and has an upright straight portion which extends downwardly below the horizontal portion 103 of the band 63 as shown in FIG. 1 so as to prevent axial movement of the band.

The belt assembly 10 has a conventional drive means (not shown) which may be as shown in FIG. 3 of said U.S. Pat. No. 3,797,338. The frame F of the machine A² may be the same as that shown in that figure with the supporting members 46 located substantially as shown. The control panel for the machine A² may also be the same as that of the machine A.

A suitable stop means is provided at one end of the drum assembly to limit axial movement of the tubes a so that the bands 63 cause the tubes to be held against the stop means during the cutting operation. An adjustable stop means may be provided as disclosed in said U.S. Pat. No. 3,797,338 or a fixed stop may be provided. It is preferable to provide a fixed stop on the end of the drum assembly. As herein shown a flat circular disc or washer 180 is rigidly mounted on the shaft portion 121 at the end of the drum 124 by a series of screws 182.

The tubes a are moved axially against the stop member 180 in response to rotation of the endless belt assembly 10 and the tubes. This is caused by pressure applied to the endless bands 63 or by causing one or all of the bands to be skewed slightly in a direction to effect axial movement of the tubes toward the stop means 180. As disclosed in said patent, such skewing may be affected by one or more adjustable arms 100 having a pin 101 projecting therefrom and engaging the adjacent band 63.

As shown each arm 100 is adjustably mounted in an inclined position by a bracket 106 which is rigidly connected to the frame F by a screw 107. The arm is connected to the inclined portion of the bracket by an adjusting screw 108 which is tightened by a wing nut 109.

A machine of the type shown in said patent is normally used with a series of rotary knives or cutters 18 mounted on the spindle 7 for cutting tubes a of moderate diameters, such as ½ to 1½ inches or so. Each knife is spaced axially from the next knife by the collar 17 a distance equal to the desired length of the cut tube.

With the equipment adjusted as described above for multiple cutting, each tube a is placed on the inclined feed table parallel to the axis of the drum in a single row and moves toward the drum as the other tubes in a row are fed one at a time to the drum. The vane 26 lifts the lowermost tube a from the row on the inclined feed table and advances it around the drum toward the rotary knives.

The bands 63 cause the tube a to rotate at an angular speed at least several times that of the drum so that the tube makes at least one complete revolution while in contact with the rotary knives.

The rotary knives 18 are adjusted horizontally toward or away from the drum as described in said patent to move the slide in or out as required when cutting tubes of different diameters. The peripheral edge of each knife should project slightly beyond the internal surface of the tube.

Such multiple cutting operation with gang cutters is effective for cutting tubes of common sizes when using a drum assembly of the type shown in said U.S. Pat. No. 3,797,338 with properly positioned radial vanes, and it can sometimes be employed to cut tubes with larger diameters, such as 2.5 to 3 inches, provided that the walls of the tube have adequate thickness and resistance to deformation.

It is preferred to effect cutting of tubes using standard rotating knives, such as the knives shown in FIGS. 10 and 11 of said U.S. Pat. No. 3,797,338, and these knives have heretofore been used to cut tubes with peripheral walls of substantial thickness (for example, up to 0.1 inch). However, these knives can bind and pull or force the tube out of position during cutting if the cut tube sections are too short or if the wall thickness is substantially greater than 0.1 inch. For this reason, standard automatic tube cutting machines of the type described in said patent are unacceptable for automatic gang-cutting of tubes with an excessive wall thickness, such as 0.2 to 0.4 inch.

The problem of cutting special tubing with flimsy walls or walls of excessive thickness is solved, in accordance with the present invention, by replacing the conventional drum assembly (5) in the machine of said U.S. Pat. No. 3,797,338 with a special drum assembly, such as the assembly 5' shown in FIG. 3 and 4, which is constructed of a size to fit the machine. The special drum assembly is provided with a plurality of vanes of arcuate cross section, each of a size to fit and support the tube to be cut so that the tube will not deform or collapse or move out of position during cutting. The number of vanes employed can theoretically be 2 to 16 or more but is usually at least 3. The drum can be designed, for example, to receive 4 to 8 curved vanes as illustrated in the drawings, whereby one drum can be used for cutting of tubes of many different diamters. If desired each end of the drum can be provided with 24 mounting holes spaced 15 degrees apart around the drum circumference to permit use of 4, 6, 8 or 12 vanes.

The shape and design of the drum assembly used in the practice of this invention can vary substantially. As herein shown the drum assembly 5' comprises a generally cylindrical drum 124 having coaxial shaft portions 121 and 122 projecting from opposite ends of the drum and sleeves 123 detachably connected to said shaft portions by set screws 143. The sleeves are relatively thick and can be used like tires to assist in rolling the drum 12 to the desired position. The mounting means for the drum is preferably designed to permit ready removal and replacement of the drum. As shown the shaft portion 121 has a tapered end portion 121a with a drive-pin notch 125 to facilitate connection to the drive shaft of the machine, and the shaft portion 122 has an annular end portion 122a with a cylindrical bore of a size to receive a bearing 115 carried by the supporting spindle 116 of the machine.

As shown each curved vane 126 has a uniform cross section throughout its length and has a straight rib 127 of a size to fit each of the rectangular key slots 128 of the drum. Each slot has three internally threaded holes 129 located at the midpoint and also near the ends of the slot. The holes receive screws 130 which extend through holes in the ribs 127 and rigidly connect the vanes 126 to the drum. As shown in the ribs 127 have a rectangular cross section and fill the slots 128, but it will be understood that the ribs are optional. It is desirable to employ the slots 128 or other suitable means to help position the vanes 126 when the ribs 127 are omitted.

The important thing is to provide means for adjusting the internal radii of the vanes (126) so that they correspond to the external radius of the tube being cut. This adjustment may be accomplished in various ways, for example by providing a substantial number of sets of vanes (126) of different radius which fit the drum 124 (FIG. 5) or by providing semi-cylindrical plastic or sheet metal lines 126a of uniform radial thickness which fit the internal surface of the vane to provide an internal surface 131a of a predetermined smaller diameter. The liners may be polished chrome or an antifriction bearing material. Their internal radius could vary, for example, from a small fraction of an inch to several inches.

Best results are obtained by providing semi-cylindrical stainless steel vanes 126 extending the full length of the drum 124 and having a smooth polished chrome internal cylindrical surface 131 throughout its length with a radius equal to the external radius of the tubes being cut. The polished chrome surface is preferred for better wear and minimum frictional resistance to rotation of the tubes. The surface 131 usually extends at least about 170 degrees and preferably about 180 degress, and the vane 126 may be formed by cutting a cylinder in half. Each vane can be machined to provide a flat narrow edge surface 132. As shown the surface 132 and the outer edge 133 of the surface 131 are located so that they clear and almost touch the edge 38 of the feed table.

It is preferable to support the tube to be cut throughout its length, but it will be understood that part of the cylindrical surface 131 can be grooved or recessed and that the vane 126 can perform the essential functions provided that each cut section is supported at closely spaced points throughout half of its circumference during the cutting operation to prevent collapse of the tube wall during cutting. For example, a narrow helical groove or a series of narrow axially spaced grooves in the surface 131 would not interfere with proper support of the tube being cut.

The basic operation of the machine A shown herein with the improved drum assembly 5' is similar to that of the machine shown in said U.S. Pat. No. 3,797,338. For example, a number of tubes a of large radius, corresponding to the radius of the internal vane surface 131 (i.e., a radius of 2 or 3 inches) can be placed in rows on the inclined table 32 with their ends near the guides 40.

The tubes are allowed to roll on the table toward the drum 124 where they are picked up by the semi-cylindrical vanes 126 one at a time. As shown the optional horizontal stop bar 146, which extends between the supporting members 46, is positioned to permit each tube to pass under the bar and into the vane 126 and to limit movement of the next tube until it is passed by the next vane 126.

The curved vanes 126 and the optional stop 146 cooperate to effect rapid escapement of the tubes a one at a time in such a way that successive tubes a are forced into the vane 126 without malfunction even when the machine is operating at relatively high speeds. A typical machine often indexes more than once every two seconds while cutting 10 to 20 pieces from each tube, and therefore the rate of production can be 300 to 600 or more pieces per minute.

After a tube enters the curved vane 126 as shown in FIG. 1, its associated vane moves clockwise in unison with the drum 124 until the tube moves into engagement with the portions 105 of the endless rubber bands 63. This causes the tube to rotate and applies a force to the tube in the direction of its vane to press the tube against the vane. One or more of the bands 63 is skewed so that the tube is caused to move axially in response until it engages the flat stop plate 180. Such engagement takes place before the tube moves into engagement with the rotary cutters 18.

The axial feeding by the skewed band 63 makes it possible to position the tube a against the stop 180 even when the ends of the tubes on the table 32 are out of alignment by a substantial amount.

Continued rotation of the drum causes each tube a to be moved into contact with the rotary cutters 18 while the next successive tube is positioned in the next vane 126 of the drum. The tube remains in contact with the rotary cutters for a point of time sufficient to allow the bands 63 to rotate the tube a at least one revolution.

Prior to this invention difficulty was encountered when trying to cut tube sections of short axial length. The present invention solves this problem because the cut pieces are continually subjected to an axial force holding them axially against the curved vane 126 with the first section in engagement with the stop 180. This prevents the cut pieces from tilting during cutting and maintains them in proper alignment after they move out of contact with the rotary knives until they move out of contact with the endless bands 63 or until they are released from the vanes.

As shown in FIG. 1, the cut sections a' of the tube are adapted to be caught by a discharge ramp, but it will be understood that these cut pieces could be allowed to fall downwardly onto a conveyor or a receptacle for removal from the machine. As shown, the machine has a discharge ramp comprising of a flat board 138 of fiberboard or the like rigidly mounted on a horizontal bar 35a by screws 135a. The bar 35a extends between a pair of support brackets 33a and may be rigidly mounted in various adjusted positions like the bar 35. The angular position of the discharge ramp is not critical and is selected to facilitate high speed operation.

The special drum 124 of the present invention is usually employed for gang cutting of pieces at a rate of several hundred per minute, using an arrangement of the type disclosed above, but it will be understood that the drum 124 can also be used when practicing the invention claimed in said U.S. Pat. No. 3,797,338, in which case flexible bands, such as the sheet metal bands 110 of said patent, may be employed to maintain the tubes a in their vanes 126 for many revolutions of the drum while cutting washers or pieces of short axial length.

It will be understood that high speed operation can be achieved on the machine shown in FIG. 1 even when the stop bar 146 is omitted. With typical tubes satisfactory feeding from the feed ramp can usually be achieved without the stop bar because the upper roller 61 functions like the bar 146 to limit movement of the tubes and to prevent cascading. If desired the upper roller 61 can be located closer to the indicated position of the stop bar 146 when such bar is omitted so that there will be less chance for a malfunction during high speed operation and so that malfunctions do not result when the vanes of the drum 5' shown in FIG. 1 are replaced with semicylindrical vanes of relatively small radius. It will be understood that a change from large to small vanes may be accompanied by an adjustment of the position of the feed ramp 32 to assure proper feeding during high-speed operation.

The present invention also makes it possible to cut tubes which are damaged or deformed or which have non-cylindrical or interrupted internal surfaces which will not permit use of a mandrel. In general, mandrels require tubes which have unobstructed internal cylindrical surfaces free of dents or the like. The machine of the present invention can be readily adapted to receive generally cylindrical tubes having substantial defects because the deformed portions of the tube usually do not prevent the tube from entering the curved vane of the drum, such as the vane 126.

It should be noted that the present invention does not require substantial changes in existing machines of the type disclosed in said U.S. Pat. No. 3,797,338 but merely requires provision of replacement drums and special curved vanes. Therefore the process of the present invention can be practiced by making changes in existing machines which are economical and which require a minimum amount of equipment.

It will be understood that the machine of this invention can be employed to cut rods or tubes made of various types of material. The rods or tubes are usually made of a material which is easily sawed or cut by a knife, such as paper, cardboard, plastic, rubber or the like, but it will be understood that the invention may be applied to the cutting of foils and metallic materials and may be applied to the cutting of solid rods or rigid cellular rods made of various materials.

The present invention makes it possible to cut thick-wall tubes which heretofore could not be cut satisfactorily on conventional automatic machines using standard rotating knives of the type shown in FIGS. 10 and 11 of said U.S. Pat. No. 3,797,338. There is a problem when gang cutting thick walled tubes with such knives because of excessive pressure of the knives on the tube which tends to force the tube out of position during cutting. This problem is serious when cutting ordinary lengths, and is even more serious when cutting very short lengths. The present invention solves the problem by properly supporting the tubing during cutting so that the tubing and the pieces cut therefrom are not misaligned or forced out of their proper position by the pressure of the rotating knives.

It will be understood that, in accordance with the provisions of the patent laws, various and modifications of the specific method and devices disclosed herein may be made without departing from the spirit of the invention.

Having described my invention I claim:

1. A machine for mass producing lengths of tubing from thin-walled tubes of substantial diameter without use of mandrels to support the tubes comprising a rotary drum having a series of outwardly extendingly vanes spaced around the periphery to receive a series of long hollow tubes, a spindle parallel to said drum for supporting a series of rotary knives, said spindle having a series of cylindrical collars mounted thereon and adapted to clamp one of said knives between each pair of said collars for multiple cutting operations, a plurality of endless band driving means, each comprising rollers above and below said drum and an endless belt extending around said rollers and having a deflected portion extending between the upper and lower rollers for engaging the periphery of each tube to rotate the same during cutting, means for driving at least one of said rollers to rotate the belt, a stop at the end of said drum for engaging the end of the tube during the cutting of that tube, means for skewing the belt in a direction to cause each tube to be advanced axially toward said stop in response to rotation of the tube by said belt, one rotary knife being located to project part way into the tube during the cutting operation, said belt being adapted to rotate the tube at least one revolution while it is in contact with the knife so that the tube is severed by the knife, characterized in that each of said vanes is shaped to fit the tube around about half of its circumference and each vane has an outer edge which moves to a position during the cutting operation wherein it is spaced radially from the periphery of the rotary knife a distance less than 1/10 the external diameter of the tube, there is a feed table with the outer edges of each vane almost touching the edge of said feed table, and there is a stop bar for the tubes above the edge of said feed table so that said tubes feed between the edge of said feed table and said stop bar.

2. In a machine for mass producing lengths of tubing from thin-walled tubes of substantial diameter comprising a rotary drum having a series of outwardly extendingly vanes spaced around the periphery to receive a series of long hollow tubes, an inclined feed ramp for supporting a row of tubes parallel to the drum axis, a spindle parallel to said drum for supporting a series of rotary knives, said spindle having a series of cylindrical collars mounted thereon and adapted to clamp one of said knives between each pair of said collars for multiple cutting operations, a plurality of endless band driving means each comprising rollers above and below said drum and an endless belt extending around said rollers and having a deflected portion extending between the upper and lower rollers for engaging the periphery of each tube to rotate the same during cutting, means for drivng at least one of said rollers to rotate the belt, a stop at the end of said drum for engaging the end of the tube during the cutting of that tube, means for skewing the belt in a direction to cause each tube to be advanced axially toward said stop in response to rotation of the tube by said belt, one rotary knife being located to project part way into the tube during the cutting operation, said belt being adapted to rotate the tube at least one revolution while it is in contact with the knife so that the tube is severed by the knife, the improvement wherein each of said vanes has a generally semi-cylindrical shape and has an outer edge which moves to a position during the cutting operation wherein it is spaced radially from the periphery of the rotary knife of a small fraction of an inch, each vane having an antifriction internal surface for engaging the outer surface of each tube to facilitate rotation thereof relative to the drum, said tubes being fed onto said vanes between the edge of a feed table and a stop bar with the outer edges of said vanes almost touching the edge of said feed table.

3. A machine according to Claim 2 characterized in that each of the semi-cylindrical vanes is mounted on a special drum and has a smooth internal surface having a radius of at least one inch to receive tubes with a diameter of a least two inches.

4. The machine of claim 2 wherein each vane has a smooth polished internal semi-cylindrical surface and has an outer edge which travels in a path spaced less than one-quarter inch from said rotary knives and from the discharge end of said feed ramp.

5. The machine of claim 4 wherein the stop bar is spaced a short distance from said path to permit the lowermost tube of the feed ramp to roll off the ramp to a position on the drum in engagement with the internal surface of one of said vanes, said stop bar being engageable with the next adjacent tube on the ramp to stop downward movement of the tubes on the ramp until the next vane of the drum passes said adjacent tube, whereby the tubes are escaped one at a time from said feed ramp to said drum.

* * * * *